United States Patent
Nakatsutsumi et al.

(10) Patent No.: US 10,153,512 B2
(45) Date of Patent: Dec. 11, 2018

(54) ELECTROLYTE SOLUTION AND BATTERY

(71) Applicant: Panasonic Intellectual Property Management Co., Ltd., Osaka (JP)

(72) Inventors: Takayuki Nakatsutsumi, Osaka (JP); Mayumi Maenishi, Osaka (JP); Nobuhiko Hojo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 261 days.

(21) Appl. No.: 15/157,486

(22) Filed: May 18, 2016

(65) Prior Publication Data

US 2016/0351955 A1  Dec. 1, 2016

(30) Foreign Application Priority Data

May 25, 2015  (JP) ................. 2015-105056

(51) Int. Cl.
*H01M 4/131* (2010.01)
*H01M 4/133* (2010.01)
(Continued)

(52) U.S. Cl.
CPC ... *H01M 10/0525* (2013.01); *H01M 10/0568* (2013.01); *H01M 10/0569* (2013.01); *H01M 4/505* (2013.01); *H01M 4/525* (2013.01); *H01M 4/587* (2013.01); *H01M 10/052* (2013.01); *H01M 10/0567* (2013.01); *H01M 2300/0034* (2013.01); *H01M 2300/0037* (2013.01)

(58) Field of Classification Search
CPC ...... H01M 4/505; H01M 4/525; H01M 4/587; H01M 10/052; H01M 10/0525; H01M 10/0567; H01M 10/0568; H01M 10/0569; H01M 2300/0034; H01M 2300/0037
See application file for complete search history.

(56) References Cited

U.S. PATENT DOCUMENTS

| | | | |
|---|---|---|---|
| 2013/0157147 A1* | 6/2013 | Li | H01M 4/525 429/332 |
| 2014/0234729 A1* | 8/2014 | Kanazawa | H01M 4/485 429/338 |
| 2015/0188193 A1* | 7/2015 | Kodama | H01M 10/052 429/188 |

FOREIGN PATENT DOCUMENTS

JP  10-289731  10/1998

* cited by examiner

*Primary Examiner* — Brittany L Raymond
(74) *Attorney, Agent, or Firm* — McDermott Will & Emery LLP

(57) ABSTRACT

An electrolyte solution contains a non-aqueous solvent and an alkali metal salt dissolved in the non-aqueous solvent. The non-aqueous solvent contains a linear carboxylate represented by the following formula:

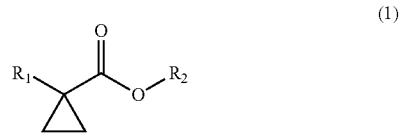

(1)

where $R_1$ and $R_2$ independently represent an aromatic group, an unsaturated aliphatic group, or a saturated aliphatic group. A battery includes the electrolyte solution, a positive electrode containing a positive electrode active material that has a property of occluding and releasing an alkali metal ion, and a negative electrode containing an alkali metal or a negative electrode active material that has a property of occluding and releasing the alkali metal ion.

12 Claims, 3 Drawing Sheets

(51) Int. Cl.
*H01M 10/0525* (2010.01)
*H01M 10/0564* (2010.01)
*H01M 10/0568* (2010.01)
*H01M 10/0569* (2010.01)
H01M 4/505 (2010.01)
H01M 4/525 (2010.01)
H01M 4/587 (2010.01)
H01M 10/052 (2010.01)
H01M 10/0567 (2010.01)

ELECTROLYTE SOLUTION AND BATTERY

BACKGROUND

1. Technical Field

The present disclosure relates to an electrolyte solution for batteries and a battery.

2. Description of the Related Art

Japanese Unexamined Patent Application Publication No. 10-289731 discloses a non-aqueous electrolyte battery including a non-aqueous electrolyte solution containing a solvent containing ethylene carbonate.

SUMMARY

Conventional techniques are required to provide high-reliability batteries.

In one general aspect, the techniques disclosed here feature an electrolyte solution containing a non-aqueous solvent and an alkali metal salt dissolved in the non-aqueous solvent. The non-aqueous solvent contains a linear carboxylate represented by the following formula:

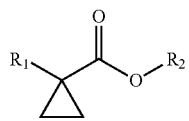

(1)

where $R_1$ and $R_2$ independently represent an aromatic group, an unsaturated aliphatic group, or a saturated aliphatic group. In one general aspect, the techniques disclosed here feature a battery including the above-mentioned electrolyte solution, a positive electrode containing a positive electrode active material that has a property of occluding and releasing an alkali metal ion, and a negative electrode containing an alkali metal or a negative electrode active material that has a property of occluding and releasing the alkali metal ion.

According to the present disclosure, a high-reliability battery can be achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
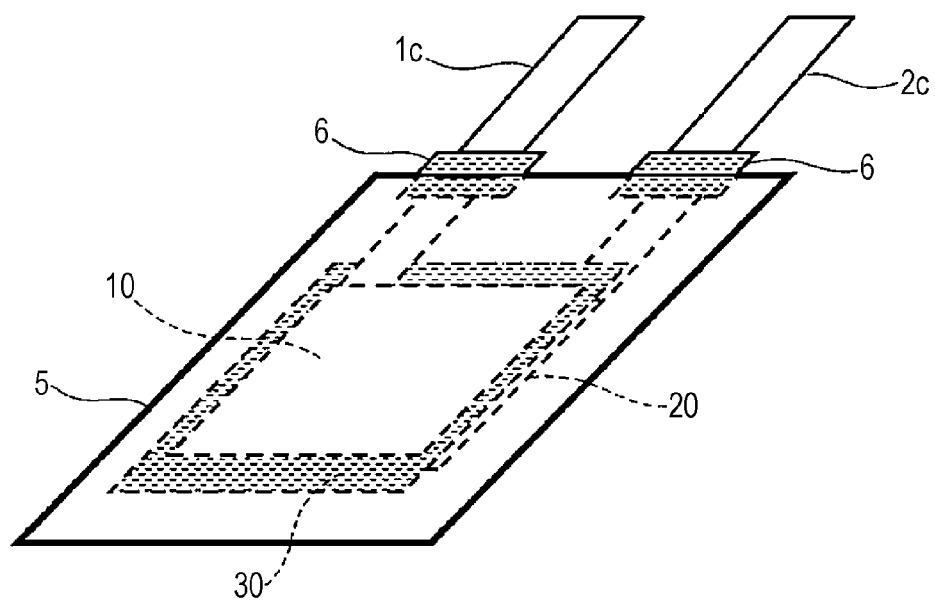
FIG. 1 is a schematic perspective view of an example of a battery according to a second embodiment.

Embodiments of the present disclosure are described below.

First, a viewpoint of the inventor is described below.

For example, batteries used in automobiles need to have high reliability even in high-temperature environments. That is, a solvent that is more reliable than conventional solvents in environments with high temperatures (for example, 60° C. or higher) is needed.

The inventor has created a configuration according to the present disclosure on the basis of the above viewpoint.

First Embodiment

An electrolyte solution according to a first embodiment contains a non-aqueous solvent and an alkali metal salt dissolved in the non-aqueous solvent.

The non-aqueous solvent contains a linear carboxylate represented by the following formula:

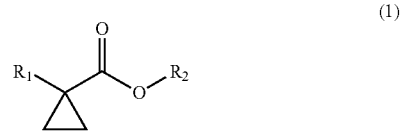

(1)

where $R_1$ and $R_2$ independently represent an aromatic group, an unsaturated aliphatic group, or a saturated aliphatic group.

According to the above configuration, the electrolyte solution is stable on a positive electrode and a negative electrode even at high temperatures. That is, the electrolyte solution has high reliability. This allows a high-reliability battery to be achieved.

In general, an α-hydrogen atom is likely to be abstracted from a carboxylate by one-electron reduction as expressed by the following formula:

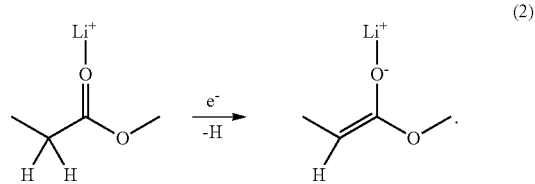

(2)

Therefore, the carboxylate is likely to undergo continuous reductive degradation on the negative electrode, which reaches low potential during charge. In particular, this reaction is promoted at a high temperature of 60° C. or higher.

However, the linear carboxylate represented by Formula (1) contains no α-hydrogen atom. Therefore, the linear carboxylate represented by Formula (1) probably has increased reduction resistance. Such a factor probably leads to an increase in reliability.

The carboxylate and a carbonate undergo one-electron oxidation on the positive electrode, which reaches high potential during charge, and therefore are degraded, whereby gas such as $CO_2$ is generated. In particular, this reaction is promoted at a high temperature of 60° C. or higher.

When the linear carboxylate represented by Formula (1) undergoes one-electron oxidation, a radical cation is produced in association with the opening of a cyclopropyl group. The polymerization of the radical cation produces a polymer insoluble in the electrolyte solution. The polymer is estimated to be deposited on the positive electrode. The polymer on the positive electrode probably protects a surface of the positive electrode. This probably suppresses the continuous oxidative degradation of the electrolyte solution. Such a factor probably leads to an increase in reliability.

In Formula (1), $R_1$ and $R_2$ may be the same substituent.

In Formula (1), $R_1$ and $R_2$ may be different substituents.

In Formula (1), a hydrogen atom in $R_1$ or $R_2$ may be substituted by a fluorine atom.

The linear carboxylate represented by Formula (1) may be methyl 1-methylcyclopropane-1-carboxylate, in which $R_1$ and $R_2$ are methyl groups; ethyl 1-methylcyclopropane-1-carboxylate, in which $R_1$ is a methyl group and $R_2$ is an ethyl group; methyl 1-ethylcyclopropane-1-carboxylate, in which $R_1$ is an ethyl group and $R_2$ is a methyl group; ethyl 1-ethylcyclopropane-1-carboxylate, in which $R_1$ and $R_2$ are ethyl groups; methyl 1-vinylcyclopropane-1-carboxylate, in which $R_1$ is a vinyl group and $R_2$ is a methyl group; vinyl 1-methylcyclopropane-1-carboxylate, in which $R_1$ is a methyl group and $R_2$ is a vinyl group; methyl 1-phenylcyclopropane-1-carboxylate, in which $R_1$ is a phenyl group and $R_2$ is a methyl group; phenyl 1-methylcyclopropane-1-carboxylate, in which $R_1$ is a methyl group and $R_2$ is a phenyl group; methyl 1-trifluoromethylcyclopropane-1-carboxylate, in which in which $R_1$ is a trifluoromethyl group and $R_2$ is a methyl group; trifluoromethyl 1-methylcyclopropane-1-carboxylate, in which in which $R_1$ is a methyl group and $R_2$ is a trifluoromethyl group; and the like. These carboxylates may be used alone or in combination.

In the electrolyte solution, both $R_1$ and $R_2$ in Formula (1) may be methyl groups.

That is, in the electrolyte solution, the linear carboxylate represented by Formula (1) may be methyl 1-methylcyclopropane-1-carboxylate.

According to the above configuration, the ionic conductivity (ionic conductance) of the electrolyte solution can be increased.

The non-aqueous solvent may contain a non-aqueous compound in addition to the linear carboxylate represented by Formula (1).

The non-aqueous compound used may be a known solvent for non-aqueous electrolytes. In particular, the non-aqueous compound used may be a cyclic carbonate, a linear carbonate, a cyclic carboxylate, a linear carboxylate not represented by Formula (1), a linear nitrile, a cyclic ether, a linear ether, or the like.

When the non-aqueous solvent contains the cyclic carbonate, the ionic conductivity of the electrolyte solution can be increased. The cyclic carbonate used may be ethylene carbonate, fluoroethylene carbonate, propylene carbonate, butylene carbonate, vinylene carbonate, vinylethylene carbonate, and derivatives thereof. These carbonates may be used alone or in combination. In the case of using at least one selected from the group consisting of ethylene carbonate, fluoroethylene carbonate, and propylene carbonate, the ionic conductivity of the electrolyte solution can be increased. In the case of using fluoroethylene carbonate, the stability of the electrolyte solution on the negative electrode can be increased.

In the electrolyte solution, the non-aqueous solvent may contain fluoroethylene carbonate.

According to the above configuration, the ionic conductivity of the electrolyte solution can be increased. The stability of the electrolyte solution on the negative electrode can be increased.

The linear carbonate used may be dimethyl carbonate, ethyl methyl carbonate, diethyl carbonate, and derivatives thereof. These derivatives used may be fluorinated products prepared by substituting a hydrogen atom of each of these carbonates by a fluoro group. In the case of using the fluorinated products, the stability of the electrolyte solution on the positive electrode can be increased. These carbonates and derivatives may be used alone or in combination.

The cyclic carboxylate used may be α-butyrolactone, α-valerolactone, and derivatives thereof. These derivatives used may be compounds prepared by substituting a hydrogen atom of each of these lactones by a fluoro group. In the case of using the compounds, the oxidation resistance of the electrolyte solution can be increased. These lactones and derivatives may be used alone or in combination.

Examples of the linear carboxylate not represented by Formula (1) include methyl acetate, ethyl acetate, propyl acetate, methyl propionate, ethyl propionate, propyl propionate, and derivatives thereof. These derivatives used may be compounds prepared by substituting a hydrogen atom of each of these carboxylates by a fluoro group. In the case of using these compounds, the oxidation resistance of the electrolyte solution can be increased. These carboxylates and derivatives may be used alone or in combination.

The linear nitrile used may be acetonitrile, propionitrile, butyronitrile, valeronitrile, isobutyronitrile, pivalonitrile, adiponitrile, pimelonitrile, and derivatives thereof. These derivatives used may be compounds prepared by substituting a hydrogen atom of each of these nitriles by a fluoro group. In the case of using these compounds, the oxidation resistance of the electrolyte solution can be increased. These nitriles and derivatives may be used alone or in combination.

The cyclic ether used may be 1,3-dioxolane, 1,4-dioxolane, tetrahydrofuran, 2-methyltetrahydrofuran, and derivatives thereof. These derivatives used may be compounds prepared by substituting a hydrogen atom of each of these ethers by a fluoro group. In the case of using these compounds, the oxidation resistance of the electrolyte solution can be increased. These ethers and derivatives may be used alone or in combination.

The linear ether used may be 1,2-dimethoxyethane, dimethyl ether, diethyl ether, dipropyl ether, ethyl methyl ether, diethylene glycol dimethyl ether, diethylene glycol diethyl ether, diethylene glycol dibutyl ether, and derivatives thereof. These derivatives used may be compounds prepared by substituting a hydrogen atom of each of these ethers by a fluoro group. In the case of using these compounds, the oxidation resistance of the electrolyte solution can be increased. These ethers and derivatives may be used alone or in combination.

The alkali metal salt, which is dissolved in the non-aqueous solvent, may be a lithium salt, a sodium salt, or the like.

The lithium salt used may be $LiClO_4$, $LiBF_4$, $LiPF_6$, $LiN(SO_2F)_2$, $LiN(SO_2CF_3)_2$, lithium bis(oxalato)borate (LiBOB), or the like.

The sodium salt used may be $NaClO_4$, $NaBF_4$, $NaPF_6$, $NaN(SO_2F)_2$, $NaN(SO_2CF_3)_2$, or the like.

In the electrolyte solution, the alkali metal salt may be the lithium salt.

The lithium salt may be at least one selected from the group consisting of $LiBF_4$, $LiPF_6$, $LiN(SO_2CF_3)_2$, and $LiN(SO_2F)_2$.

According to the above configuration, the ionic conductivity of the electrolyte solution can be increased.

The molar content of the alkali metal salt in the electrolyte solution may be, for example, 0.5 mol/L to 2.0 mol/L.

In the electrolyte solution, the proportion of the volume of the linear carboxylate represented by Formula (1) to the volume of the non-aqueous solvent may be 1% by volume or more.

According to the above configuration, a high-reliability battery can be achieved.

In the electrolyte solution, the proportion of the volume of the linear carboxylate represented by Formula (1) to the volume of the non-aqueous solvent may be 50% by volume or more.

According to the above configuration, a higher-reliability battery can be achieved.

In the electrolyte solution, the proportion of the volume of the linear carboxylate represented by Formula (1) to the volume of the non-aqueous solvent may be 80% by volume or more.

According to the above configuration, a higher-reliability battery can be achieved.

Second Embodiment

A second embodiment is described below. Descriptions common to the first embodiment will be appropriately omitted.

A battery according to the second embodiment includes the electrolyte solution according to the first embodiment, a positive electrode, and a negative electrode.

The positive electrode contains a positive electrode active material that has a property of occluding (i.e. capable of storing and releasing) one or more alkali metal ions.

The negative electrode contains an alkali metal or a negative electrode active material that has a property of occluding (i.e. capable of storing and releasing) the one or more alkali metal ions.

According to the above configuration, a battery which has high reliability even in, for example, high-temperature environments can be achieved.

The battery according to the second embodiment may be configured as, for example, a secondary battery.

In the battery according to the second embodiment, the negative electrode may contain the alkali metal. The alkali metal may be lithium.

According to the above configuration, a battery with enhanced battery characteristics such as energy density or reliability can be achieved.

In the battery according to the second embodiment, the negative electrode may contain the negative electrode active material. The negative electrode active material may be carbon.

According to the above configuration, a battery with enhanced battery characteristics such as energy density or reliability can be achieved.

In the battery according to the second embodiment, the positive electrode active material may be a metal oxide containing lithium and at least one selected from the group consisting of nickel, cobalt, and manganese.

According to the above configuration, a battery with enhanced battery characteristics such as energy density or reliability can be achieved.

FIG. 1 is a schematic perspective view of an example of the battery according to the second embodiment.

Figure 2:
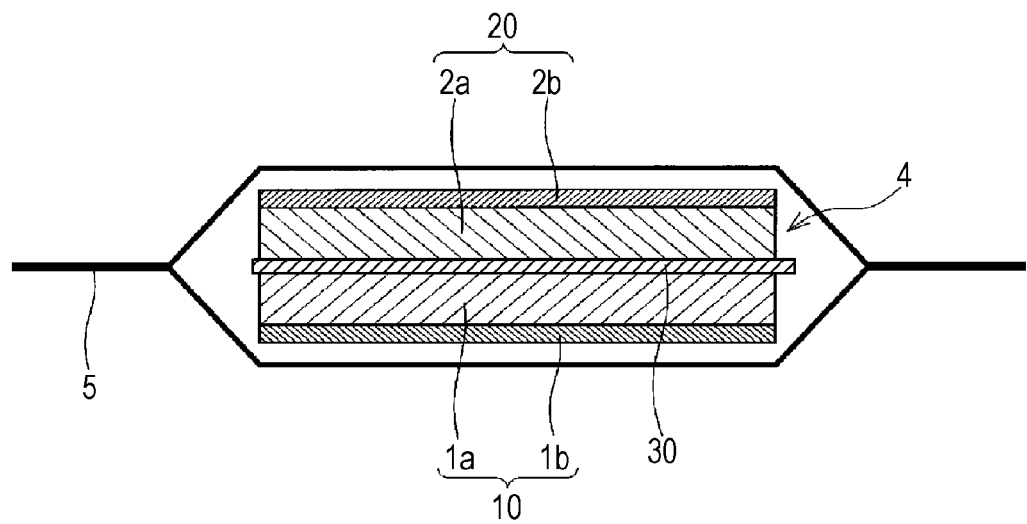
FIG. 2 is a schematic sectional view of an example of the battery according to the second embodiment.

FIG. 2 is a schematic sectional view of an example of the battery according to the second embodiment.

As shown in FIGS. 1 and 2, the battery according to the second embodiment includes an electrode group 4 and an enclosure 5.

The electrode group 4 is housed in the enclosure 5.

The electrode group 4 includes a positive electrode 10, a negative electrode 20, and a separator 30.

The positive electrode 10 is composed of a positive electrode current collector 1b and a positive electrode mix layer 1a.

The positive electrode mix layer 1a is placed on the positive electrode current collector 1b.

The negative electrode 20 is composed of a negative electrode current collector 2b and a negative electrode mix layer 2a.

The negative electrode mix layer 2a is placed on the negative electrode current collector 2b.

The positive electrode 10 and the negative electrode 20 face each other with the separator 30 therebetween. This forms the electrode group 4.

The electrode group 4 is impregnated with the electrolyte solution according to the first embodiment.

The positive electrode current collector 1b is connected to a positive electrode tab lead 1c.

The negative electrode current collector 2b is connected to a negative electrode tab lead 2c.

The positive electrode tab lead 1c and the negative electrode tab lead 2c extend out of the enclosure 5.

An insulating tab film 6 is placed between the positive electrode tab lead 1c and the enclosure 5.

Another insulating tab film 6 is placed between the negative electrode tab lead 2c and the enclosure 5.

The positive electrode mix layer 1a contains the positive electrode active material, which is capable of storing and releasing the alkali metal ions.

The positive electrode active material is a material capable of storing and releasing one or more of the alkali metal ions. The positive electrode active material used may be, for example, an alkali metal-containing transition metal oxide, an alkali metal-containing transition metal fluoride, an alkali metal-containing polyanionic material, an alkali metal-containing fluorinated polyanionic material, an alkali metal-containing transition metal sulfide, or the like. The positive electrode active material used may be, for example, lithium-containing transition metal oxides such as $Li_xMe_yO_2$ and $Li_{1+x}Me_yO_3$, where $0<x\leq1$, $0.95\leq y<1.05$, and Me includes at least one selected from the group consisting of Co, Ni, Mn, Fe, Cr, Cu, Mo, Ti, and Sn. Alternatively, the positive electrode active material used may be lithium-containing polyanionic materials such as $Li_xMe_yPO_4$ and $Li_xNe_yP_2O_7$, where $0<x\leq1$, 0.95 y<1.05, and Me includes at least one selected from the group consisting of Co, Ni, Mn, Fe, Cu, and Mo. The positive electrode active material used may be a sodium-containing transition metal oxide such as $Na_xMe_yO_2$, where $0<x\leq1$, $0.95\leq y<1.05$, and Me includes at least one selected from the group consisting of Co, Ni, Mn, Fe, Cr, Cu, Mo, Ti, and Sn.

The positive electrode current collector 1b used may be a porous or poreless sheet or porous or poreless film made of a metal material such as aluminium, an aluminium alloy, stainless steel, titanium, or a titanium alloy. When the positive electrode current collector 1b is made of aluminium or an alloy thereof, the positive electrode current collector 1b is inexpensive and is readily obtained in the form of a thin film. Such a sheet or film used may be metal foil, metal mesh, or the like. The positive electrode current collector 1b may be surface-coated with a carbon material such as carbon for the purpose of reducing the resistance, the purpose of imparting catalysis, or the purpose of strengthening the bond between the positive electrode mix layer 1a the positive electrode current collector 1b.

The negative electrode mix layer 2a contains the negative electrode active material, which is capable of storing and releasing the alkali metal ions.

The negative electrode active material used may be the alkali metal or a material capable of storing and releasing the alkali metal ions. The material capable of storing and releasing the alkali metal ions may be an alkali metal alloy, carbon, a transition metal oxide, a silicon material, or the like. For example, a negative electrode material for lithium secondary batteries may be an alloy of lithium and at least one selected from the group consisting of Zn, Al, Sn, Si, Pb, Na, Ca, In, and Mg; a carbon material such as synthetic graphite, natural graphite, non-graphitizable amorphous carbon, or graphitizable amorphous carbon; a transition metal oxide such as $Li_4Ti_5O_{12}$, $TiO_2$, or $V_2O_5$; $SiO_x$, where $0<x\leq 2$; metallic lithium; or the like. For example, a negative electrode material for sodium secondary batteries may be an alloy of sodium and at least one selected from the group consisting of Zn, Al, Sn, Si, Pb, Na, Ca, In, and Mg; a carbon material such as non-graphitizable amorphous carbon or graphitizable amorphous carbon; a transition metal oxide such as $Na_2Ti_3O_7$ or $Na_2Ti_6O_{13}$; metallic sodium; or the like.

The negative electrode current collector 2b used may be a porous or poreless sheet or porous or poreless film made of a metal material such as aluminium, an aluminium alloy, stainless steel, nickel, a nickel alloy, copper, or a copper alloy. When the negative electrode current collector 2b is made of aluminium or an alloy thereof, the negative electrode current collector 2b is inexpensive and is readily obtained in the form of a thin film. Such a sheet or film used may be metal foil, metal mesh, or the like. The negative electrode current collector 2b may be surface-coated with a carbon material such as carbon for the purpose of reducing the resistance, the purpose of imparting catalysis, or the purpose of strengthening the bond between the negative electrode mix layer 2a and the negative electrode current collector 2b.

The separator 30 used may be a porous film made of polyethylene, polypropylene, glass, cellulose, ceramic, or the like. For example, pores in the separator 30 are impregnated with the electrolyte solution.

The positive electrode mix layer 1a and the negative electrode mix layer 2a may contain a conductive aid, an ionic conductor, or a binder.

The conductive aid used may be a carbon material such as carbon black, graphite, or acetylene black; a conductive polymer such as polyaniline, polypyrrole, or polythiophene; or the like.

The ionic conductor used may be a gel electrolyte such as polymethyl methacrylate, a solid electrolyte such as polyethylene oxide, or the like.

The binder used may be polyvinylidene fluoride, a vinylidene fluoride-hexafluoropropylene copolymer, a vinylidene fluoride-tetrafluoroethylene copolymer, polytetrafluoroethylene, carboxymethylcellulose, polyacrylic acid, styrene-butadiene copolymer rubber, polypropylene, polyethylene, polyimide, or the like.

Each of the conductive aid, ionic conductor, and binder used may be a generally known material.

The shape of the battery according to the second embodiment may be a sheet shape, a coin shape, a button shape, a stack shape, a cylindrical shape, a flat shape, a rectangular shape, or the like.

EXAMPLES

Examples of the present disclosure are described below. The present disclosure is not limited to the examples below.

Example 1

Preparation of Non-Aqueous Electrolyte Solution

In a solvent mixture of fluoroethylene carbonate (CAS No. 114435-02-8) and methyl 1-methylcyclopropane-1-carboxylate (CAS No. 6206-25-3) mixed at a volume ratio of 1:4, 1.0 mol/L of $LiPF_6$ (CAS No. 21324-40-3) was dissolved, whereby a non-aqueous electrolyte solution was prepared.

Preparation of Positive Electrode Plate

A prepared positive electrode active material was Li(Ni, Co, Al)$O_2$. With 100 parts by weight of the positive electrode active material, 5 parts by weight of acetylene black serving as a conductive agent and 5 parts by weight of a polyvinylidene fluoride resin serving as a binder were mixed. The mixture was dispersed in dehydrated N-methyl-2-pyrrolidone, whereby a slurry-like positive electrode mix was prepared. The positive electrode mix was applied to a surface of a positive electrode current collector made of aluminium foil with a thickness of 15 μm. The resulting positive electrode current collector was dried and was then rolled, whereby a positive electrode plate was obtained. The quantity of application of the dry positive electrode mix was 10 mg/cm².

Preparation of Negative Electrode Plate

The following materials were mixed together: 98 parts by weight of a synthetic graphite powder, 1 part by weight of styrene-butadiene rubber, and 1 part by weight of carboxymethylcellulose. The mixture was dispersed in water, whereby a slurry-like negative electrode mix was prepared. The negative electrode mix was applied to a surface of a negative electrode current collector made of copper foil with a thickness of 10 μm. The resulting negative electrode current collector was dried and was then rolled, whereby a negative electrode plate was obtained. The quantity of application of the dry negative electrode mix was 6.5 mg/cm².

Preparation of Sheet Battery

Figure 3:
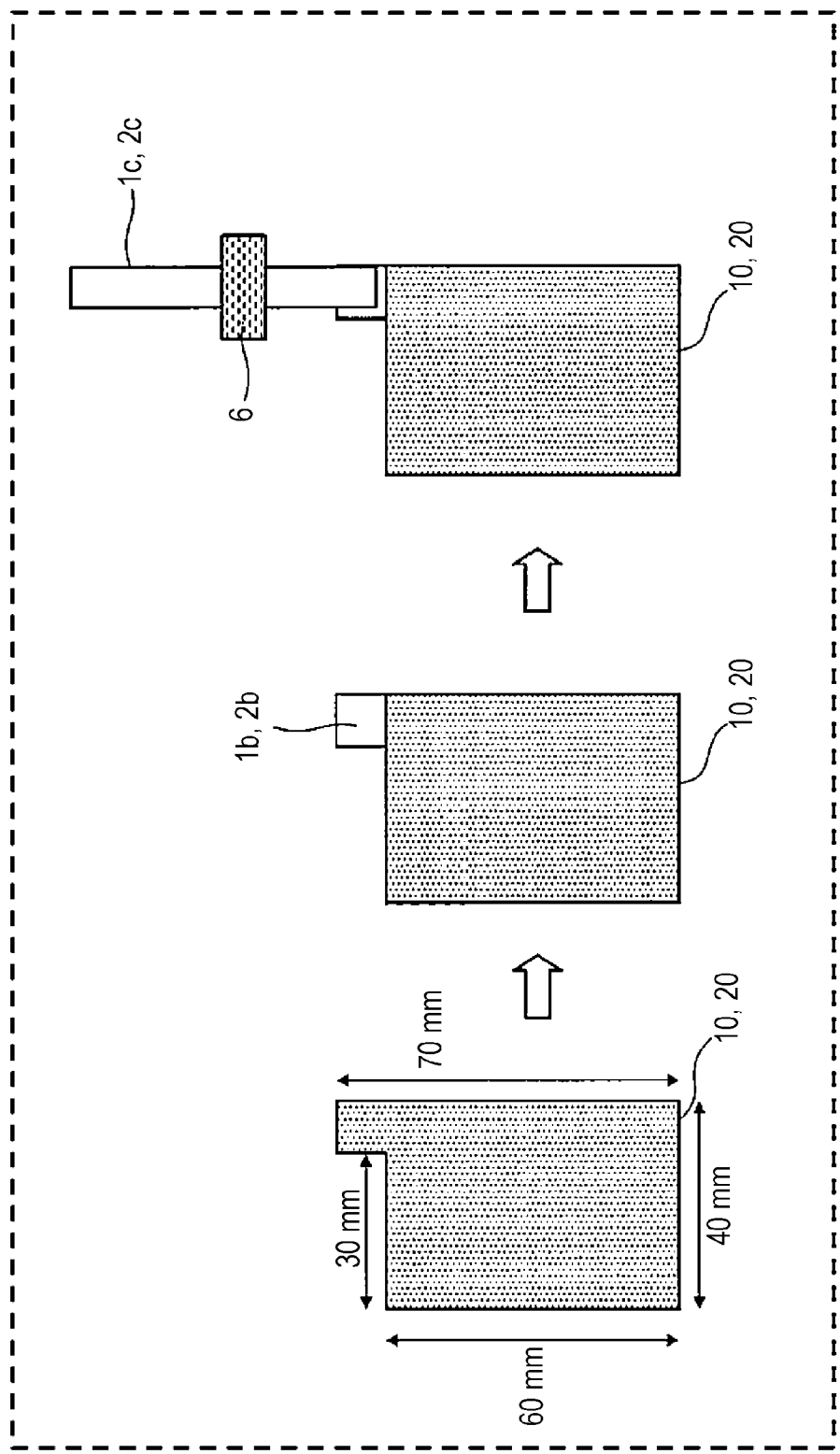
FIG. 3 is a schematic view of the configuration of an electrode plate used in Example 1.

FIG. 3 is a schematic view of the configuration of an electrode plate used in Example 1.

Figure 4:
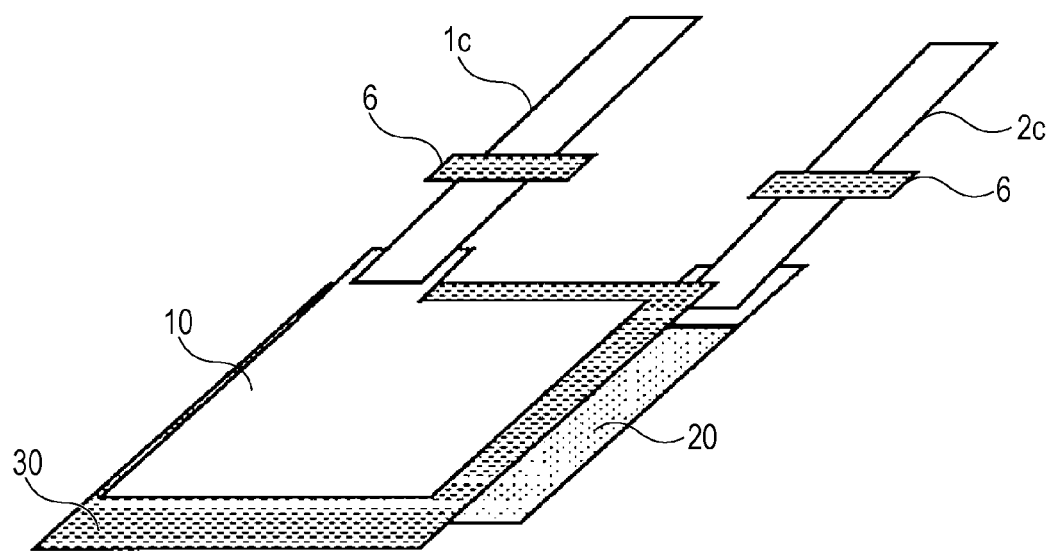
FIG. 4 is a schematic perspective view of the configuration of a battery prepared in Example 1.

FIG. 4 is a schematic perspective view of the configuration of a battery prepared in Example 1.

The positive electrode plate and negative electrode plate were worked so as to have the configuration shown in FIG. 3. The area of each of a positive electrode and a negative electrode was 24 cm². A positive electrode tab lead used was made of aluminium. A negative electrode tab lead used was made of nickel. The positive electrode and negative electrode tab leads had a heat welding resin heat-welded thereto. As shown in FIG. 4, the positive electrode plate and the negative electrode plate were arranged to face each other with a separator therebetween, the separator being made of polypropylene and having a thickness of 30 μm, such that the positive electrode and the negative electrode overlapped each other, whereby an electrode group was prepared.

Next, a 120 mm square aluminium laminate with a thickness of 100 μm was folded. A 120 mm long end surface of the folded aluminium laminate was heat-sealed at 230° C. The aluminium laminate was shaped into a cylinder with a size of 120 mm×60 mm. The electrode group prepared as shown in FIG. 4 was put in the aluminium laminate through a 60 mm long end surface thereof. An end surface of the aluminium laminate was aligned with the heat welding resin of each tab lead and was heat-sealed at 230° C.

Next, 0.8 cc of the non-aqueous electrolyte solution was poured into the aluminium laminate from an unsealed side thereof. Thereafter, the aluminium laminate was left stationary for 15 minutes in a vacuum of 0.06 MPa, whereby the positive and negative electrode mixes were impregnated with the non-aqueous electrolyte solution.

Finally, the unsealed side of the aluminium laminate was heat-sealed at 230° C., whereby a battery was prepared.
Evaluation of Battery The battery, which was prepared as described above, was evaluated in accordance with a procedure below.

During evaluation, the battery was pressed at 0.2 MPa using a C-shaped clamp in such a manner that the electrode group was interposed between 80 cm square stainless steel sheets with a thickness of 2 mm through the aluminium laminate.

In a 25° C. thermostatic chamber, the battery was repeatedly charged and discharged at a constant current of 1 mA for three cycles. The charge of the battery was terminated at a voltage of 4.2 V. The discharge of the battery was terminated at a voltage of 2.5 V. The battery was left in an open circuit for 20 minutes during a period between charge and discharge.

Next, in the 25° C. thermostatic chamber, the battery was charged to 4.2 V at a constant current of 5 mA. Thereafter, the battery was maintained at a constant voltage of 4.2 V until the current reached less than 1 mA. After the battery was left in an open circuit for 20 minutes, the battery was discharged to 2.5 V at a constant current of 1 mA in the 25° C. thermostatic chamber. In this operation, the discharge capacity of the battery was measured. The discharge capacity of the battery was defined as the "capacity before high-temperature charge".

Next, in a 60° C. thermostatic chamber, the battery was charged to 4.2 V at a constant current of 5 mA. Thereafter, the battery was continuously charged at a constant voltage of 4.2 V for 72 hours. After the thermostatic chamber was returned to 25° C., the battery was left in an open circuit for 1 hour. Thereafter, the battery was discharged at a constant current of 1 mA. In this operation, the discharge capacity of the battery was measured. The discharge capacity of the battery was defined as the "capacity after high-temperature charge".

The ratio of the "capacity after high-temperature charge" to the "capacity before high-temperature charge" was calculated and was defined as the "capacity retention", which was used as an indicator for reliability. The result is shown in the table.

Example 2

A solvent mixture of fluoroethylene carbonate, dimethyl carbonate, and methyl 1-methylcyclopropane-1-carboxylate mixed at a volume ratio of 20:79:1 was used to prepare an electrolyte solution.

A battery was prepared in substantially the same manner as that described in Example 1 except that the solvent mixture was used. Thereafter, the battery was evaluated in the same manner as that described in Example 1. The result is shown in the table.

Comparative Example 1

A solvent mixture of fluoroethylene carbonate and dimethyl carbonate (CAS No. 616-38-6) mixed at a volume ratio of 1:4 was used to prepare an electrolyte solution.

A battery was prepared in substantially the same manner as that described in Example 1 except that the solvent mixture was used. Thereafter, the battery was evaluated in the same manner as that described in Example 1. The result is shown in the table.

Comparative Example 2

A solvent mixture of fluoroethylene carbonate and methyl acetate (CAS No. 79-20-9) mixed at a volume ratio of 1:4 was used to prepare an electrolyte solution.

A battery was prepared in substantially the same manner as that described in Example 1 except that the solvent mixture was used. Thereafter, the battery was evaluated in the same manner as that described in Example 1. The result is shown in the table.

Comparative Example 3

A solvent mixture of fluoroethylene carbonate and methyl propionate (CAS No. 554-12-1) mixed at a volume ratio of 1:4 was used to prepare an electrolyte solution.

A battery was prepared in substantially the same manner as that described in Example 1 except that the solvent mixture was used. Thereafter, the battery was evaluated in the same manner as that described in Example 1. The result is shown in the table.

Comparative Example 4

A solvent mixture of fluoroethylene carbonate and methyl pivalate (CAS No. 598-98-1) mixed at a volume ratio of 1:4 was used to prepare an electrolyte solution.

A battery was prepared in substantially the same manner as that described in Example 1 except that the solvent mixture was used. Thereafter, the battery was evaluated in the same manner as that described in Example 1. The result is shown in the table.

TABLE

| | Solvents | Capacity retention |
|---|---|---|
| Example 1 | Fluoroethylene carbonate and methyl 1-methylcyclopropane-1-carboxylate | 98.2% |
| Example 2 | Fluoroethylene carbonate, dimethyl carbonate, and methyl 1-methylcyclopropane-1-carboxylate | 97.1% |
| Comparative Example 1 | Fluoroethylene carbonate and dimethyl carbonate | 96.9% |
| Comparative Example 2 | Fluoroethylene carbonate and methyl acetate | 96.5% |
| Comparative Example 3 | Fluoroethylene carbonate and methyl propionate | 96.0% |
| Comparative Example 4 | Fluoroethylene carbonate and methyl pivalate | 97.2% |

As is clear from the above results, allowing a non-aqueous electrolyte solution to contain methyl 1-methylcyclopropane-1-carboxylate increases the reliability of a battery. This effect is probably exhibited by the presence of a cyclopropyl group and the absence of a hydrogen atom at the α-position of a carboxylate.

As is clear from the above results, in the case of a carboxylate containing no α-hydrogen atom, the effect of increasing reliability to a certain extent is obtained. However, the effect of increasing reliability is probably insufficient.

Thus, an effect of the present disclosure is probably exhibited by the presence of a cyclopropyl group at the α-position of a carboxylate. That is, allowing an electrolyte solution to contain the linear carboxylate represented by Formula (1) exhibits the effect of increasing reliability.

As is clear from the results of Example 2 and Comparative Example 1, reliability can be increased by the presence of a small amount of methyl 1-methylcyclopropane-1-carboxylate.

An electrolyte solution according to the present disclosure can be used as an electrolyte solution for batteries.

What is claimed is:

1. An electrolyte solution comprising:
a non-aqueous solvent; and
an alkali metal salt dissolved in the non-aqueous solvent,
wherein the non-aqueous solvent contains a linear carboxylate represented by the following formula:

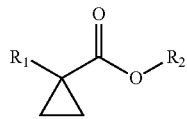
(1)

where $R_1$ and $R_2$ independently represent an aromatic group, an unsaturated aliphatic group, or a saturated aliphatic group.

2. The electrolyte solution according to claim 1, wherein both $R_1$ and $R_2$ in Formula (1) are methyl groups.

3. The electrolyte solution according to claim 1, wherein the proportion of the volume of the linear carboxylate to the volume of the non-aqueous solvent is 1% by volume or more.

4. The electrolyte solution according to claim 3, wherein the proportion of the volume of the linear carboxylate to the volume of the non-aqueous solvent is 50% by volume or more.

5. The electrolyte solution according to claim 4, wherein the proportion of the volume of the linear carboxylate to the volume of the non-aqueous solvent is 80% by volume or more.

6. The electrolyte solution according to claim 1, wherein the non-aqueous solvent contains fluoroethylene carbonate.

7. The electrolyte solution according to claim 1, wherein the alkali metal salt is a lithium salt.

8. The electrolyte solution according to claim 7, wherein the lithium salt is at least one selected from the group consisting of $LiBF_4$, $LiPF_6$, $LiN(SO_2CF_3)_2$, and $LiN(SO_2F)_2$.

9. A battery comprising:
an electrolyte solution;
a positive electrode containing a positive electrode active material that has a property of occluding and releasing an alkali metal ion; and
a negative electrode containing an alkali metal or a negative electrode active material that has a property of occluding and releasing the alkali metal ion,
wherein the electrolyte solution contains a non-aqueous solvent and an alkali metal salt dissolved in the non-aqueous solvent and the non-aqueous solvent contains a linear carboxylate represented by the following formula:

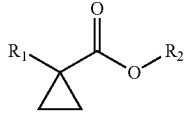
(1)

where $R_1$ and $R_2$ independently represent an aromatic group, an unsaturated aliphatic group, or a saturated aliphatic group.

10. The battery according to claim 9, wherein the negative electrode contains the alkali metal and the alkali metal is lithium.

11. The battery according to claim 9, wherein the negative electrode contains the negative electrode active material and the negative electrode active material is carbon.

12. The battery according to claim 9, wherein the positive electrode active material is a metal oxide containing lithium and at least one selected from the group consisting of nickel, cobalt, and manganese.

* * * * *